US006288708B1

(12) United States Patent
Stringer

(10) Patent No.: US 6,288,708 B1
(45) Date of Patent: Sep. 11, 2001

(54) INTERACTIVE DISPLAY SYSTEMS, PARTICULARLY COMPUTER SYSTEMS AND TELEVIS ION SETS

(75) Inventor: Roy Stringer, Merseyside (GB)

(73) Assignee: Amaze Limited, Liverpool (GB)

( * ) Notice: Subject to any disclaimer, the term of this patent is extended or adjusted under 35 U.S.C. 154(b) by 0 days.

(21) Appl. No.: 09/022,018

(22) Filed: Feb. 11, 1998

(30) Foreign Application Priority Data

Jul. 2, 1997 (GB) .................................................. 9713870

(51) Int. Cl.[7] ....................................................... G04G 5/00
(52) U.S. Cl. .......................... 345/169; 345/146; 345/157; 345/354; 725/60; 725/61; 463/14
(58) Field of Search ................................ 345/348, 349, 345/352, 353, 354, 357, 145, 146, 358, 902, 327, 157, 169, 172; 725/60, 61; 463/9, 11, 14, 36, 39, 54

(56) References Cited

U.S. PATENT DOCUMENTS

| 5,296,845 | * | 3/1994 | Haller | 345/168 |
| 5,598,523 | * | 1/1997 | Fujita | 345/352 |
| 5,602,596 | * | 2/1997 | Claussen et al. | 348/564 |
| 5,874,959 | * | 2/1999 | Rowe | 345/339 |

OTHER PUBLICATIONS

The Atari Touch Tablet with Atari Artist Software—Owner's Guide Atari Home Computers, 1983, pp. 1–21.
Accu–Type 3 for Windows Version 2.0 Copyright (C) 1983–1995 Accu–Tech Software Services, 2 pages.

* cited by examiner

*Primary Examiner*—Ba Huynh
(74) *Attorney, Agent, or Firm*—Fulwider Patton Lee & Utecht, LLP

(57) ABSTRACT

A method and apparatus for allowing interaction between an individual and a display screen, such as a computer monitor or television set. A controller has a plurality of keys having a spatial arrangement which corresponds to target areas of the display screen. Particular functions are assigned to the target areas by appropriately designed computer software and a function is selected by pressing the key located in the corresponding position on the controller. A particular function is represented by displaying an appropriate identifying characteristic in the target area of the screen thereby enabling the keys of the controller to be free from any identifying characteristics which limits its use to a designated function.

20 Claims, 6 Drawing Sheets

INTERACTIVE DISPLAY SYSTEMS, PARTICULARLY COMPUTER SYSTEMS AND TELEVIS ION SETS

BACKGROUND OF THE INVENTION

The present invention relates to an improved method and apparatus for allowing interaction between an individual and a display screen, such as the monitor of a computer system or a television set.

Human interaction with a display screen, such as a computer monitor, is generally achieved by means of a keyboard having keys assigned to a particular function or ASCII code for typing a specific letter on the screen. Alternatively a mouse or track-ball may be used to move a cursor around a computer display screen thereby targeting particular features or functions provided by the system.

The mouse is moved over a horizontal surface to cause a corresponding movement of a cursor over the vertical surface of the display screen. Once the cursor is positioned over the required feature, the mouse is clicked resulting in access being gained to the particular chosen feature. The ability to move the mouse correctly and efficiently does require a significant amount of practice and, even once mastered, does necessitate that the cursor be exactly in position to enable the feature to be selected. The mouse also has to be attached, for example by means of a lead, to the computer hardware in order to operate and hence, the operator has to be situated within close proximity of the computer screen. Furthermore, the mouse has to be moved over a flat surface hence necessitating the use of a desk or other suitable surface for allowing interaction with the computer display screen.

Alternative systems have been developed such as a touch sensitive surface. This involves the computer screen being divided into particular regions having a pictorial or other suitable representation for each region. A pressure-sensitive screen is provided over the display to allow the operator to touch the screen and select the function or feature by means of the representation corresponding to said feature or function. This requires the computer operator to be positioned close to the computer screen which is not always desirable.

Television sets also allow interaction therewith by the user, such as by means of a remote controller unit. For example, particular features on teletext may be selected by pressing an appropriate button on the remote controller unit, such as the button which is marked by a particular colour corresponding to a topic covered by teletext, such as news, sport or weather. Alternatively, particular directories may be accessed by pressing an access number given on the TV screen. The use of icons or wording on the remote controller unit may also allow the user to select the feature of his or her choice.

The aforementioned processes do have a number of drawbacks, such as being slow to operate due to the requirement to visually select the appropriate button or carefully move the mouse to position the cursor in the centre of an icon. The dedication of keys to specific functions also severely limits the number of functions which may be selected using a remote controller unit or keyboard. It is also not always appropriate for the operator to be in close proximity to the display screen.

SUMMARY OF THE INVENTION

It is an aim of the present invention to provide an improved method and an apparatus for allowing interaction between a display screen and an individual which overcomes the above-mentioned drawbacks.

According to one aspect of the present invention there is provided an apparatus for interaction between an individual and a display screen, the apparatus comprising a controller having a plurality of keys having a spatial arrangement which corresponds to target areas of the display screen, whereby selection of a target area is achieved by pressing the key located in the corresponding position on the controller.

According to a second aspect of the present invention there is provided a method of enabling interaction between a display screen and an individual utilising a controller having a plurality of keys disposed in a special arrangement which correspond to target areas of the display screen, the method comprising the steps of:

identifying the target area of the screen to be selected;

translating the position of the target area to a key situated in a corresponding position on the controller; and pressing the key to transmit an identifying code to select said target area.

The method and apparatus of the present invention are implemented by means of appropriately designed computer software. Computer software is employed to define target areas on the display screen having a position which corresponds to the spatial relationship of the keys on the controller and to determine what function or functions are to be assigned to each area and the effect of selection of a particular area.

Each target area may represent a particular function or multiple function area. In the latter case, the multiple functions will be disposed in positions which can be equated to the key positions of the controller. By this means, the functions assigned to the keys are potentially variable as they correspond to the function indicated in the target area of the screen. Software determines the functions assigned to a target area according to the application being accessed. Accordingly, the keys can be free from any numerals, pictograms, colours or other identifying characteristics.

The particular function or functions represented by an area of the screen is preferably represented by displaying an appropriate word, symbol, icon or other identifying characteristic in the target area of the screen. The option is then dynamically assigned to the appropriate key on the controller in a position corresponding to the associated target area.

The display screen is preferably divided into a 3×3 grid with the controller having a corresponding spatial arrangement of nine keys. The grid may be visible to the operator, but most usually the grid is not required to be visible since it may be imagined in the operator's mind having regard to the spatial layout of the keys on the controller.

Alternatively, the screen may be divided into a smaller or larger grid, such as a 2×2 or 6×6 grid with the controller being provided with a corresponding number of keys. If a large number of keys are to be provided, it is preferable to provide tactile nipples on the intended upper surface thereof to aid identification of the appropriate key without having to look at the controller.

The individual areas of the display screen may each be selected to divide the individual area into a plurality of discrete areas to access further functions subsidiary to the first, thereby enabling multiple functions to be accessed via one original screen, such as a 3×3 grid.

It is preferable that any keys which do not correspond to a target area and its associated function at any given time are made temporarily inoperable.

The controller may be in the form of a key pad. More preferably, the controller is in the form of a hand held unit. More preferably still, the controller is in the form of a remote control unit. The latter is advantageous as the interaction between an individual and the screen may occur with the individual situated some distance from the screen.

It is preferable to provide a remote control unit with large buttons such that the operator is able to locate the appropriate button easily.

The method and apparatus of the present invention may be used for a wide range of applications depending upon the computer program which implements the particular visual interface. For example, the interactive method and apparatus of the present invention may be used for computer games, such as chess, with moves being made by an individual using the keypad or remote control unit of the present invention. The interactive display system may also be used to edit text on a display screen.

The method and apparatus of interactive communication between an individual and a display screen of the present invention may also be utilised for interfacing with a domestic television set which contains a microprocessor. For example, the options for audio, picture and channel settings may each be presented in a region of the television screen and be selected by pressing the button corresponding in location to the area in which the required option is displayed on the screen. The selected option may then show further options which may be selected by again identifying their relative location on the screen and translating it to the controller. Preferably, the available options which are visible over the television screen are automatically removed after a few moments of inactivity.

For a better understanding of the present invention and to show more clearly how it may be carried into effect, reference will now be made by way of example only to the accompanying drawings.

DETAILED DESCRIPTION OF THE INVENTION

Figure 1:
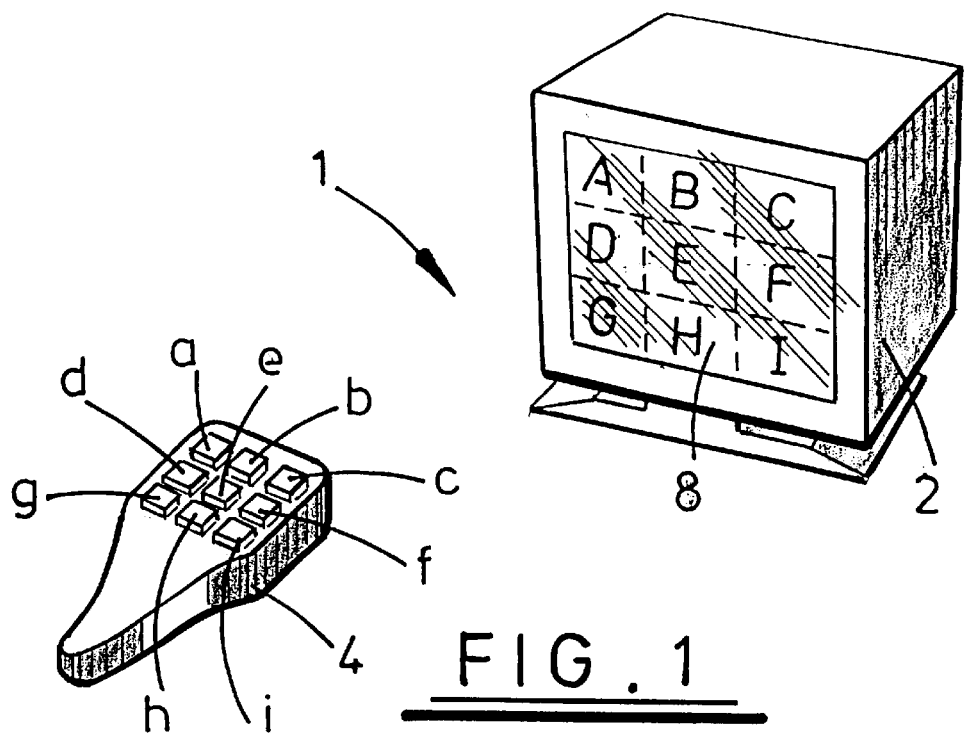
FIG. 1 is a perspective diagram of a interactive system according to one embodiment of the present invention.

Referring to FIG. 1 of the accompanying drawings, an interactive computer system 1 is shown having a visual display screen and a hand-held remote control unit 4. The remote control unit has nine buttons a to i arranged in a 3×3 grid which are free from any numerals, pictograms, colours or other identifying characteristics. The visual display screen, such as a cathode ray tube or liquid crystal display panel, is shown at 2. For the convenience of explanation, the display area of the screen is shown divided into a 3×3 grid 8 thereby dividing the screen into nine areas A to I which represent target areas and their position corresponds to the positions of buttons a to i on the remote control unit 4.

The grid 8 is not required to be visible to the eye since the operator is able to visualise how the position of the keys translates to corresponding target areas on the display screen. The operator selects a desired target area on the display screen by simply pressing the corresponding button which is located on the remote control in the same region as the desired target area on the screen. This allows the operator to select a target area without the need to look at the remote control unit and without means of identification being provided on the control unit. Hence, any function may be assigned to a button depending upon the particular visual interface program which is incorporated into the computer system. No pictorial representations or other instructions are located on the remote control unit and thus, the individual buttons of the control unit are not restricted to the particular function assigned thereto. Total interaction between the operator and the display screen is carried out using a limited number of buttons relying on the ability of humans to be able to select the appropriate button corresponding to the target area of interest. This enables the selection to be made more rapidly since the operator does not need to visually identify the correct button and hence, allows the operator to keep watching the display screen at all times. Furthermore, the present invention enables the display screen to be operated from a distance without the need for a flat surface to support the remote control unit.

Most usually the target location on the display screen is identified by placing appropriate words, symbols or icons into a target location, for example in one or more of areas A to I, on the display screen and dynamically assigning those options to the associated key. This is achieved by means of appropriate software. The operator selects the function required by means of the visual representation displayed in an area of the display screen and translates this target position to the corresponding button on the remote control unit. Pressing the button transmits an identifying key code to the display screen thereby causing the desired operation to be executed.

It is possible to use this targeting facility in conjunction with appropriate software as a means of enlarging, for example to full screen size, the information shown in a selected target area. The expansion can be repeated by carrying out one or more successive targeting operations. The number of practical enlargements will depend upon the ability of the source data to provide the desired definition. On the other hand, the targeting facility can be used to home in quickly on a particular area or part of the screen. In this case, it can be advantageous to have the software generate a grid on the screen whereby each successive key operation generates a grid or matrix corresponding to the key grid or matrix on the controller.

Figure 2A:
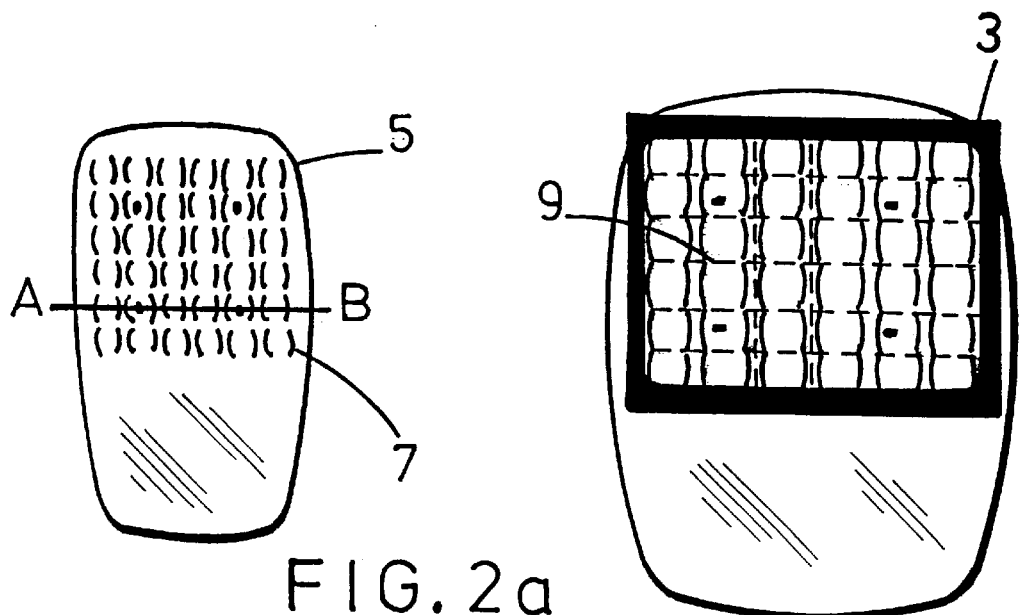
FIG. 2a is a front view of an interactive system according to another embodiment of the present invention.
Figure 2B:
FIG. 2b is a cross section of the remote control unit shown in FIG. 2a, taken along lines A–B.

The size of grid overlaying the display screen and corresponding number of buttons provided on a remote control unit or keypad are not limited to a particular size and number. For example, a remote control unit 5 with thirty six buttons 7 could be provided for operation of a display screen 3 divided into a 6×6 grid, as illustrated in FIG. 2a of the accompanying drawings. The right hand view in FIG. 2a shows the outline of a display screen 3 superimposed over the buttons 7 in order to illustrate how the position of the buttons can be visually equated to corresponding areas of the screen. Tactile nipples 11 (such as those commonly used on QWERTY keyboards) may be provided on the surface of the buttons to assist the operator in locating the appropriate button without the need to look at the buttons to confirm their relative location (as shown in FIG. 2b). However, it is to be appreciated that the fewer target locations there are, the easier it will be for the operator to locate the associated button and thereby perform the desired task.

The target areas of the display screen may be chosen to result in the particular area selected being divided into a further number (usually a corresponding number) of regions which may then be selected using the same buttons. In this manner, far more features may be available to the operator by means of only a limited number of buttons on the keypad or remote control unit. The first and indeed any successive selected target areas may be expanded up to occupy the entire display screen.

As mentioned above, the general purpose carried out by the interactive system will depend upon the computer programme which implements a particular visual interface. The following examples illustrate some of the possible activities which may be carried out using the method and apparatus for interactive communication between an operator and a display screen according to the present invention.

EXAMPLE 1

Figure 3A:
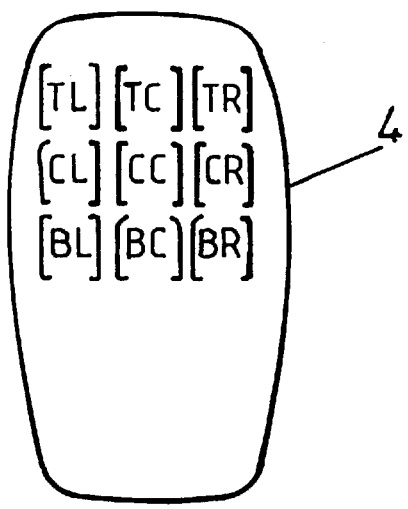
FIG. 3a is a sketch diagram of a remote control unit of an interactive system according to the present invention for playing a game of chess.

The interactive display system may be used to play a game of chess on, for example, a television-based computer system from the comfort of an armchair. The system has a remote control unit 4 having nine buttons arranged in a 3×3 grid, each button being given a two-letter identification code TL, TC, TR (top left, top centre, top right and so on) as illustrated in FIG. 3a of the accompanying drawings. It is to be appreciated that these codes need not actually be present on the controller unit, since their code is readily apparent from their positioning, but are included herein to allow a satisfactory explanation of the method of playing the game of chess by means of the interactive method and apparatus of the present invention.

Figure 3B:
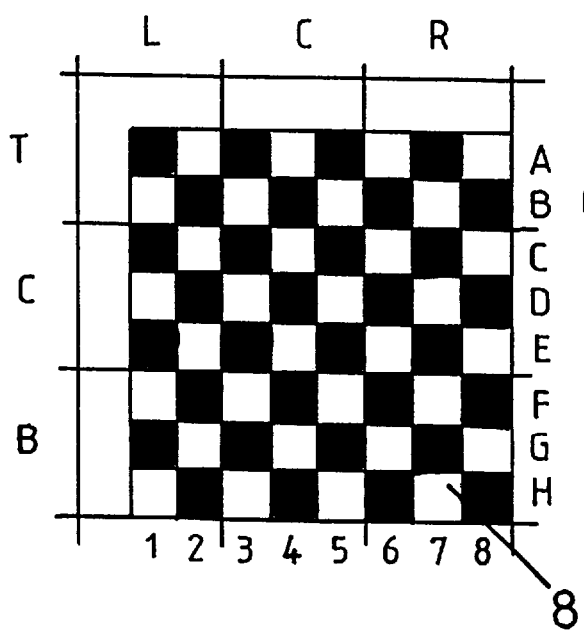
FIGS. 3b and 3c are sketch diagrams of a computer monitor of an interactive system according to the present invention for playing a game of chess.
Figure 3C:
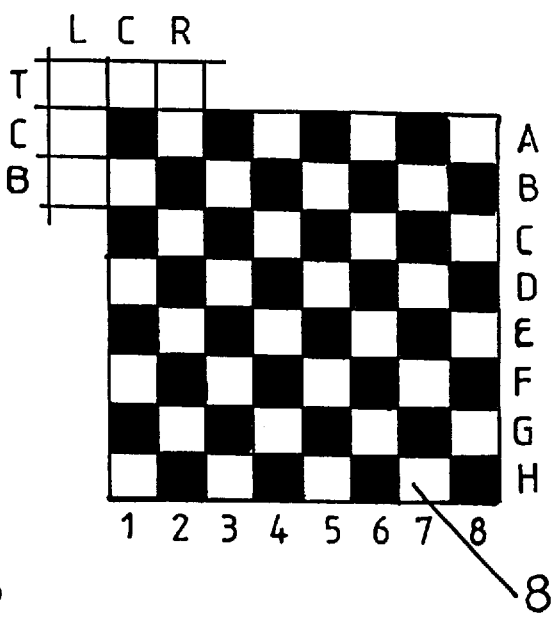

The entire screen 8 displays an 8×8 grid corresponding to a conventional chess board. The grid is given the traditional chess notation A . . . H, 1 . . . 8 in FIGS. 3b and 3c to illustrate the particular squares of the chess board. This larger grid is then divided into a 3×3 grid, identified by the grids TCB, LCR in FIGS. 3b and 3c representing the mirror image of the spatial arrangement of the buttons provided on the remote control unit 4 shown in FIG. 3a.

The chess player can execute any move in four button presses. For instance, if the operator presses button TL on the remote controller unit 4, the display screen will highlight the smaller 3×3 target area TCBLCR illustrated in the top left hand corner of FIG. 3c. The operator may now select one of the four available squares by pressing one of the buttons CC, CR, BC, BR (preferably the buttons which do not correspond to any of the chess squares are made inoperative). In this manner, any chess move may be made by means of four button presses since each square is identified by a two-button sequence, the first targeting the entire display area and a second targeting a new grid covering the area targeted by the first.

Figure 4A:
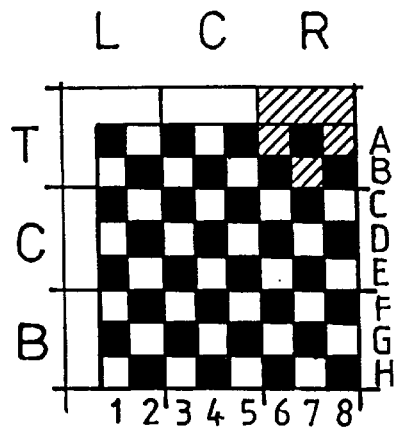
FIGS. 4a to 4d illustrate the steps involved in making one type of movement during a game of chess using the system shown in FIGS. 3a to 3c.
Figure 4B:
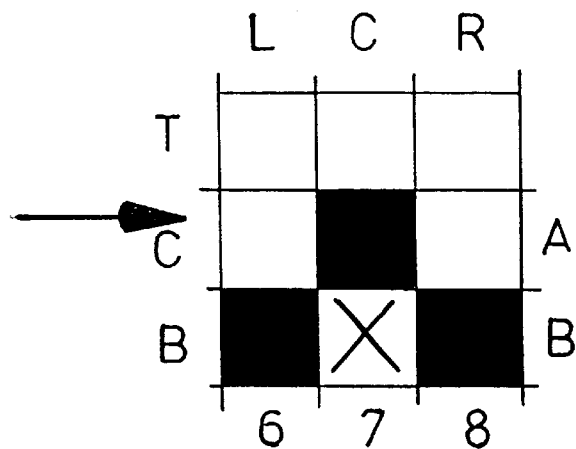
Figure 4D:
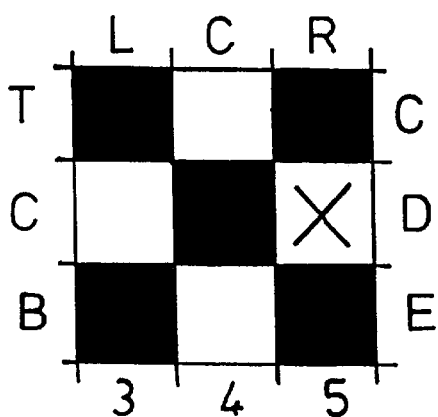
Figure 4C:
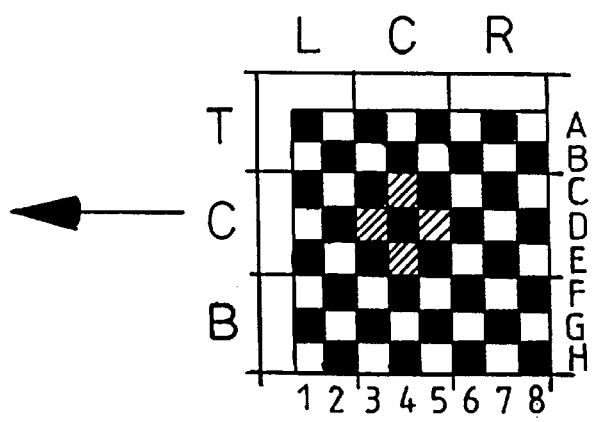

FIGS. 4a to 4d illustrate the steps in making the move from square B7 to D5 (standard chess notation) during a game of chess. Selecting the top right hand button (TR) targets the top right hand grid of the entire display screen, as shown in FIG. 4a. This region, once selected, can then be divided into a similar grid (see FIG. 4b). Pressing the bottom centre button (BC) will target the square B7 (see FIG. 4c). Movement to D5 is then achieved by selecting the central centre button (CC), followed by the central right button (CR), as shown in FIG. 4d.

EXAMPLE 2

Figure 5:
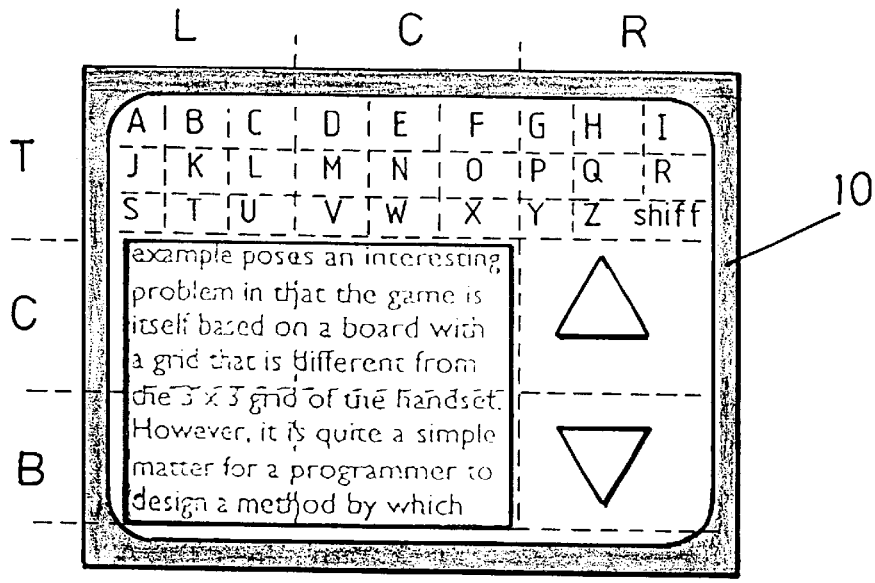
FIG. 5 is a sketch diagram of an interactive system according to the present invention for text editing.

The use of multiple key presses as described in relation to Example 1 may be applied in many ways. For example, the use of the two-tier system may be used to edit text shown on a display screen, as illustrated in FIG. 5.

The display screen 10 is divided into a 3×3 grid (TL,TC, TR and so on) as described above in relation to the chess game. The top row of buttons are assigned the letters of the alphabet by means of a second 3×3 grid being provided covering each square of the top row and a shift button is provided to present additional symbols for typing. Positions CL, CC, BL, BC are occupied with the text to be edited and hence, these buttons are made inoperable by the implementing software. Finally, the two remaining positions of the parent grid (RC, BR) are assigned with buttons for scrolling the text up and down.

The text may be edited as follows. In relation to the last word typed in the area of text shown in FIG. 5 (i.e, WHICH), the buttons which were pressed to type this word onto the display screen are TC, BC, TR, TC, TR, TR, TL, TR, TR, TC.

EXAMPLE 3

The interactive system of the present invention may also be utilised for interfacing with a domestic television set. The majority of present day television sets include a microprocessor-based method for adjusting the settings for audio, picture and channel settings, typically using special keys provided on the remote controller unit of the television set which are dedicated to these specific functions. However, by presenting these options on the television screen in predetermined spatial locations, it is possible to execute a number of adjustments, including channel selection and control settings using a grid for targeting the entire television screen and a second grid covering the area of the screen located by the first, as hereinbefore described.

Figure 6:
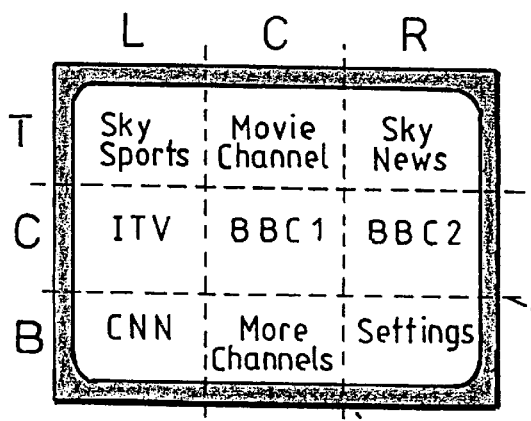
FIG. 6 is a sketch diagram of a television screen of an interactive system for selecting TV channels.
Figure 7:
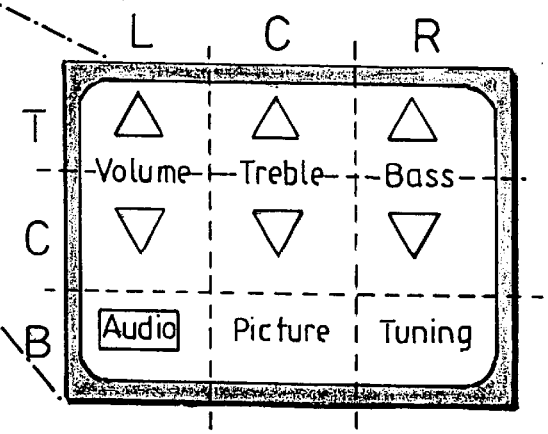
FIG. 7 is a sketch diagram of a television screen of an interactive system for adjusting TV settings.

For example, the user would press any key on the spatial grid to call up a set of options as shown in FIG. 6. These settings could then be selected using the corresponding button on the remote controller. The bottom right hand grid has a second 3×3 grid which becomes visible over the entire screen on pressing the corresponding button (BR). Further functions are then visible on the screen and may be chosen using the appropriate button. After a few moments of inactivity the overlay identifying the different features would be removed from the television screen.

Figure 8:
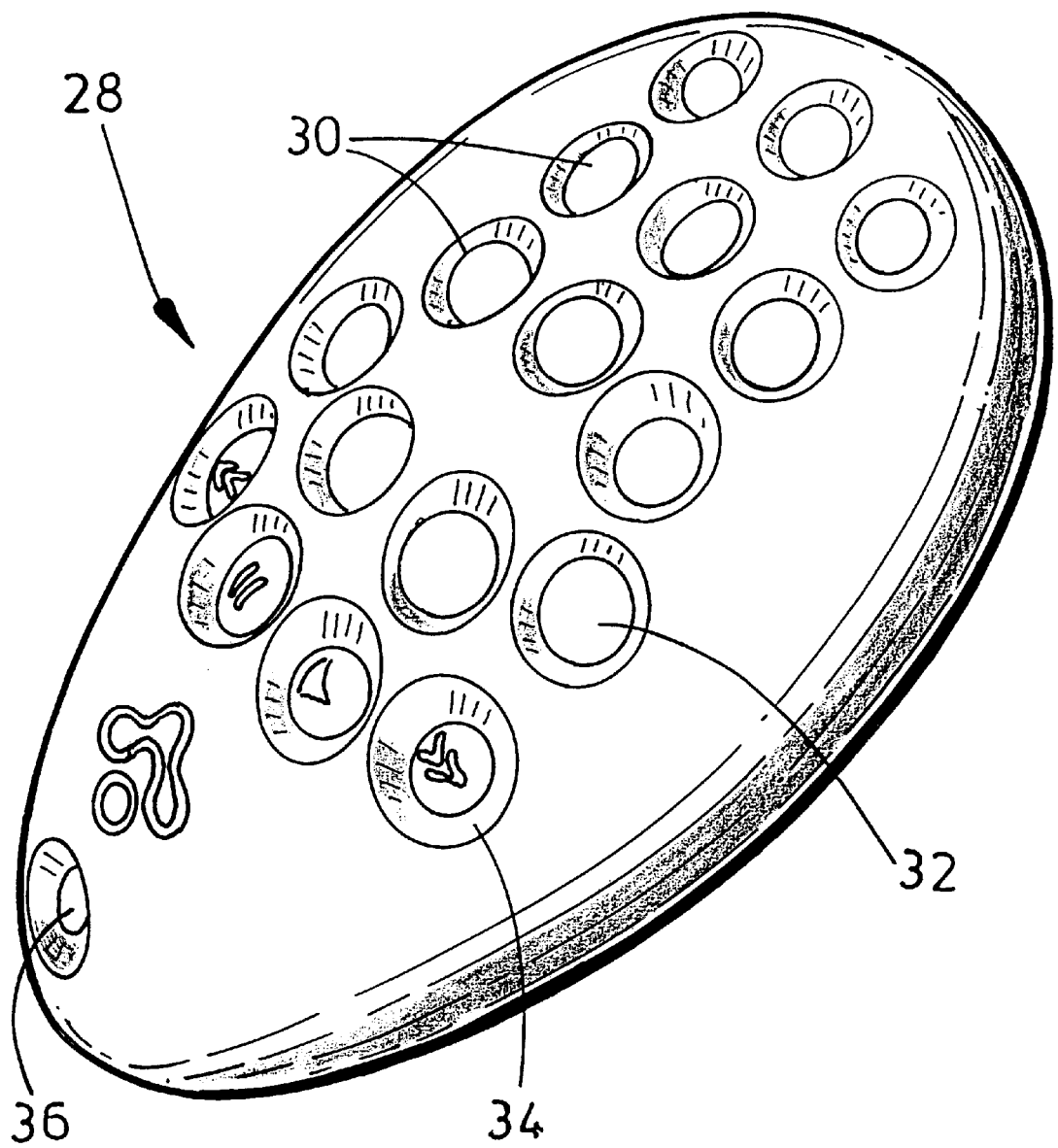
FIG. 8 is a perspective diagram of a remote control unit for use with the method and system of the present invention.

It is preferable that a user-friendly remote controller unit is provided as part of the interactive system of the present invention, having the minimum amount of buttons with few identifying characteristics contained thereon. The buttons are preferably well defined and relatively large vis a vis the remote control units of the prior art to aid selection of the appropriate button by identifying the associated target area on the screen. For example, FIG. 8 illustrates a new design of headset 28 which is easy to operate, having a 3×3 array of main controller buttons 30 for selecting the chosen function appearing in a corresponding region of the display screen. The handset 28 also has mode buttons 32 positioned below the main controller buttons, such as "reset", "back", "help" and "set up" buttons. These are arranged in a different pattern to the main controller buttons to enable the operator to readily identify the two sets through touch without the need to look at the handset. Further buttons 34 may be provided below the mode buttons and a "power" button 36 may be provided towards the base of the handset.

This type of interactive system also has a potentially wide field of application for browsing through the large number of channels and services which may be provided through a television set. For example, the system may be used to allow home shopping via shopping catalogues accessed via the television set. The system would allow particular goods of interest to the viewer to be easily and quickly called up be pressing the button corresponding to the appropriate target area on the screen. The system may also be used for interactive television programmes, for example, when viewers are required to vote for a particular subject or to allow easy access through the teletext systems without having to carefully read the individual buttons on a remote controller unit which are specific to carrying out one particular function.

Figure 9:
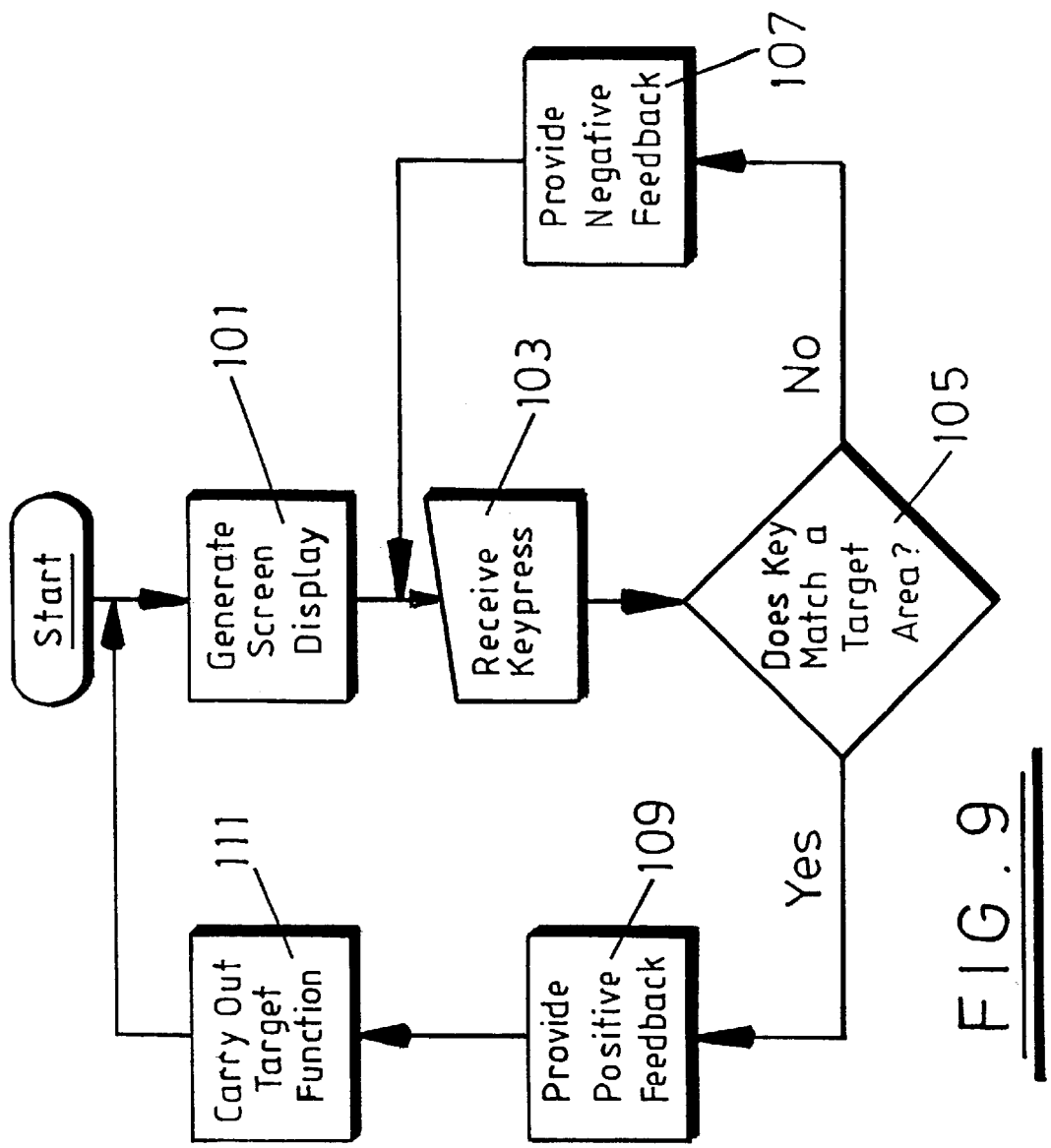
FIG. 9 is a flow chart illustrating typical steps in the method of the invention for one embodiment.
Figure 10A:
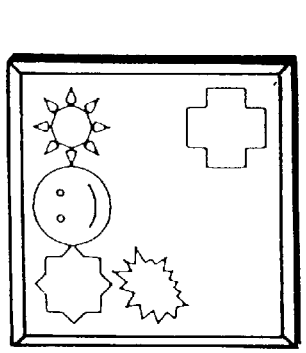
FIG. 10a shows an example of a screen layout.

Referring now to FIG. 9 there is illustrated a flowchart which shows the typical steps in performing the method of the invention according to one embodiment. Box 101 concerns generation of the on screen display which for the purpose of this example is as shown in FIG. 10. Five icons are portrayed, three along the top of the screen, one in the bottom right hand corner of the screen and one on the left hand side of the screen mid way between the top and the bottom. It is assumed that the controller has a matrix of 3×3 buttons and it will be seen that the icons occupy only some of the positions of a 3×3 matrix, but that their positions can be readily equated to the positions of the buttons on the controller.

Figure 10B:
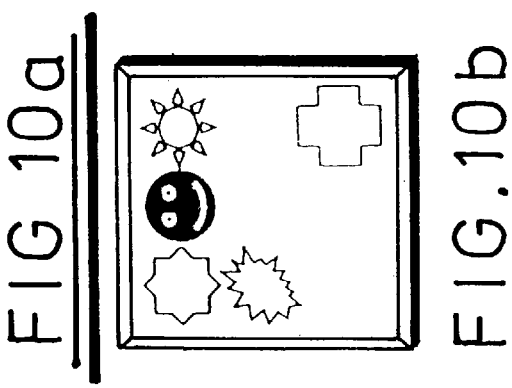
FIG. 10b shows how the same screen layout is modified to provide positive feedback to the user.

The other boxes in the flow chart are 103 which corresponds to the step of noting that a keypress has occurred and been received, box 105 which ascertains whether the key pressed matches a target area, box 107 which provides negative feedback to the operator where there is no match between the keypressed and a target area. The negative feed back may be a lack of response, an available signal and/or a suitable message signal prompting the user to try again. The program waits for the user to make another selection. Box 109 provides positive feedback to the user when a match has been found between the keypressed and a designated target area. The selected icon may change colour, flash, or be highlighted to denote to the user the function switch has been selected. FIG. 10b shows the icon in the middle on the top row in a different colour thus signifying that the middle key on the top row has been pressed. Finally, box 111 represents execution of the selected function. This may result in the generation of a new screen display requiring further key inputs until the users chosen program sequence has completed or the user wishes to exit the program.

What I claim is:

1. An apparatus for interaction between an individual and a display screen, the apparatus comprising:
   a controller having a plurality of keys in an array having a spatial arrangement which corresponds to target areas of the display screen, each of the target areas being divided into an array of smaller target areas corresponding to at least a portion of said plurality of keys;
   a processor operably connected to the display screen, the processor including software for identifying a target area of the display screen to be selected, translating the position of the target area to one of said keys situated in a corresponding position on the controller, interpreting a key press of one of said keys located in a corresponding position on the controller to transmit an identification code to select the target area, identifying one of the smaller target areas in the array of smaller target areas of said target area, translating the position of said one of said smaller target areas to one of said keys situated in a corresponding position of at least a portion of said array of said plurality of keys, and for interpreting a key press of one of said keys to transmit an identification code to select said one of the smaller target areas on the display corresponding to the location of the pressed key on the controller.

2. An apparatus as claimed in claim 1, wherein a specific function is assigned to each target area by means of appropriately designed computer software.

3. An apparatus as claimed in claim 1, wherein a target area represents a multiple function area.

4. An apparatus as claimed in claim 3, wherein the multiple functions of a target area are disposed in positions which can be equated to the positions of the keys of the controller.

5. An apparatus as claimed in claim 2, wherein the specific function represented by a target area of the screen is represented by displaying an identifying characteristic in the target area.

6. An apparatus as claimed in claim 1, wherein the display screen is divided into a grid with the controller having a corresponding spatial arrangement of keys.

7. An apparatus as claimed in claim 6, wherein the grid is visible to the individual.

8. An apparatus as claimed in claim 6, wherein the grid is invisible the individual.

9. An apparatus as claimed in claim 1, wherein each target area of the screen has a specific function assigned thereto and wherein each of the smaller target areas divided from the target area includes functions subsidiary to the target area from which it was divided to enable multiple functions to be accessed via one original screen.

10. An apparatus as claimed in claim 9, wherein the keys which do not correspond to a target area and its associated function at any given time are made temporarily inoperable.

11. An apparatus as claimed in claim 1, wherein the controller is in the form of a keypad.

12. An apparatus as claimed in claim 1, wherein the controller is a hand held remote control unit.

13. An apparatus as claimed in claim 1 for use in playing a game whereby a move in a game is made by the individual pressing a key on the controller corresponding in position to a required location to be selected on the screen.

14. An apparatus as claimed in claim 1, for use in text editing.

15. An apparatus as claimed in claim 1 for use in interfacing with a domestic television set containing a microprocessor.

16. An apparatus as claimed in claim 15, wherein television control functions are presented in target areas of the television screen for selection by pressing the key corresponding in location to the target area in which the required control function is displayed on the screen.

17. A method of enabling interaction between a display screen and an individual utilizing a controller having a plurality of keys disposed in a spatial arrangement which correspond to target areas of the display screen, each of the target areas being divided into an array of smaller target areas corresponding to at least a portion of said plurality of keys, the method comprising the steps of:

a) identifying a target area of the screen to be selected;

b) translating the position of the target area to one of said keys situated in a corresponding position on the controller;

c) pressing said one of said keys of step b) to transmit an identifying code to select said target area;

d) identifying one of the smaller target areas in the array of smaller target areas of said target area;

e) translating the position of said one of said smaller target areas to one of said keys situated in a corresponding position of at least a portion of said array of said plurality of keys; and f) pressing said one of said keys of step e) to transmit an identifying code to select said one of the smaller target areas.

18. The method of claim 17, wherein at least some of said arrays of smaller target areas correspond only to a portion of said array of said plurality of keys.

19. The method of claim 17, further comprising repeating steps a) to f) to identify a second one of said smaller target areas and to initiate operation of a predetermined function involving said two smaller target areas.

20. The apparatus of claim 1, wherein at least some of said arrays of smaller target areas correspond only to a portion of said array of said plurality of keys.

* * * * *

UNITED STATES PATENT AND TRADEMARK OFFICE
CERTIFICATE OF CORRECTION

PATENT NO. : 6,288,708 B1  
DATED : September 11, 2001  
INVENTOR(S) : Roy Stringer Page 1 of 1

It is certified that error appears in the above-identified patent and that said Letters Patent is hereby corrected as shown below:

<u>Title page, Item [54], Column 1, line 1,</u>  
In the title, change "TELEVIS ION", to read -- TELEVISION --.

Signed and Sealed this

Twelfth Day of March, 2002

Attest:

Attesting Officer

JAMES E. ROGAN  
*Director of the United States Patent and Trademark Office*